June 9, 1964  M. E. BONOMO ETAL  3,136,373
TRACTOR-DRAWN AND DRIVEN ROTARY CULTIVATOR
Filed Sept. 24, 1962  3 Sheets-Sheet 1
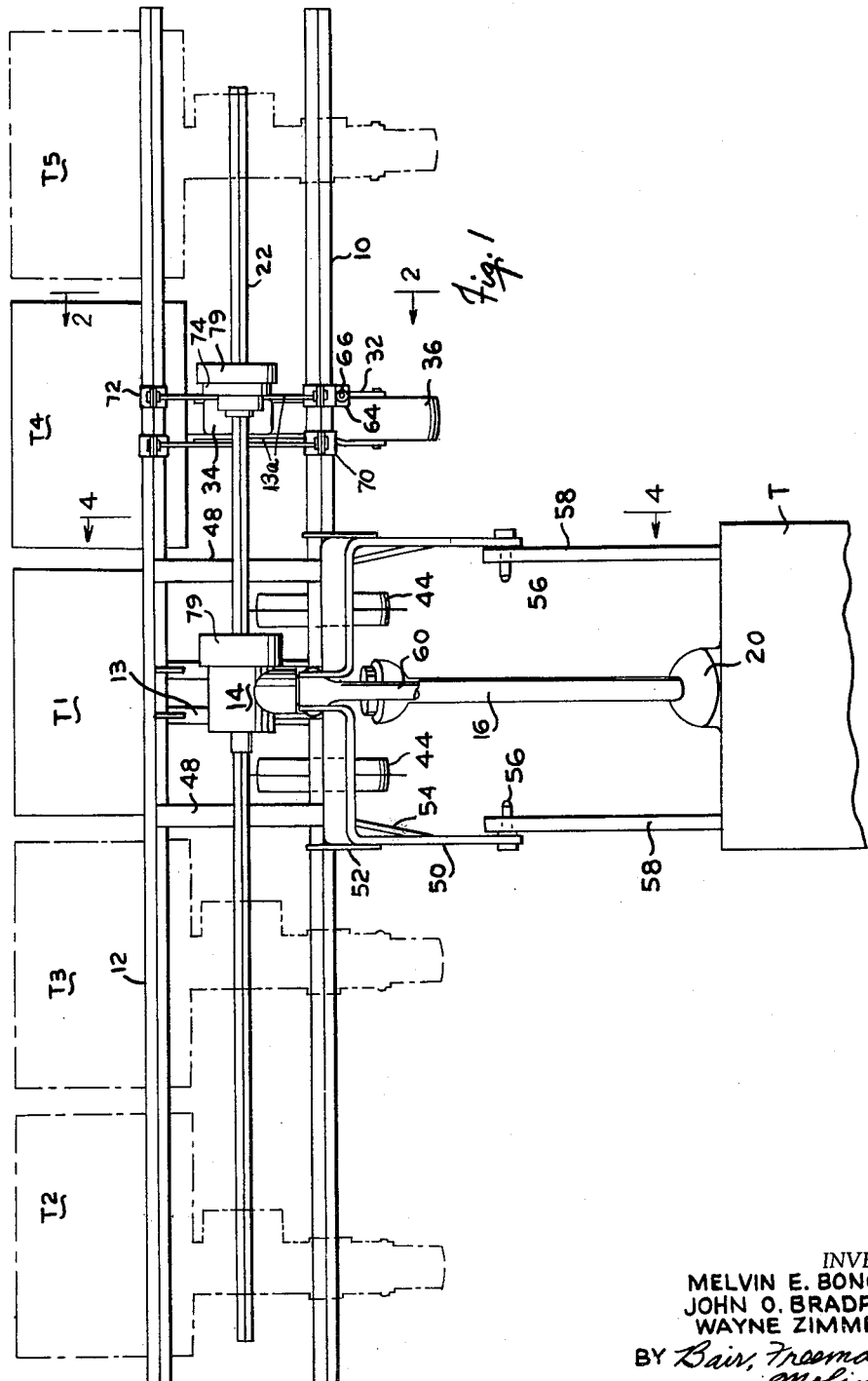
INVENTORS
MELVIN E. BONOMO
JOHN O. BRADFORD
WAYNE ZIMMERMAN
BY Bair, Freeman & Molinare
ATTYS.

June 9, 1964   M. E. BONOMO ETAL   3,136,373
TRACTOR-DRAWN AND DRIVEN ROTARY CULTIVATOR
Filed Sept. 24, 1962   3 Sheets-Sheet 2
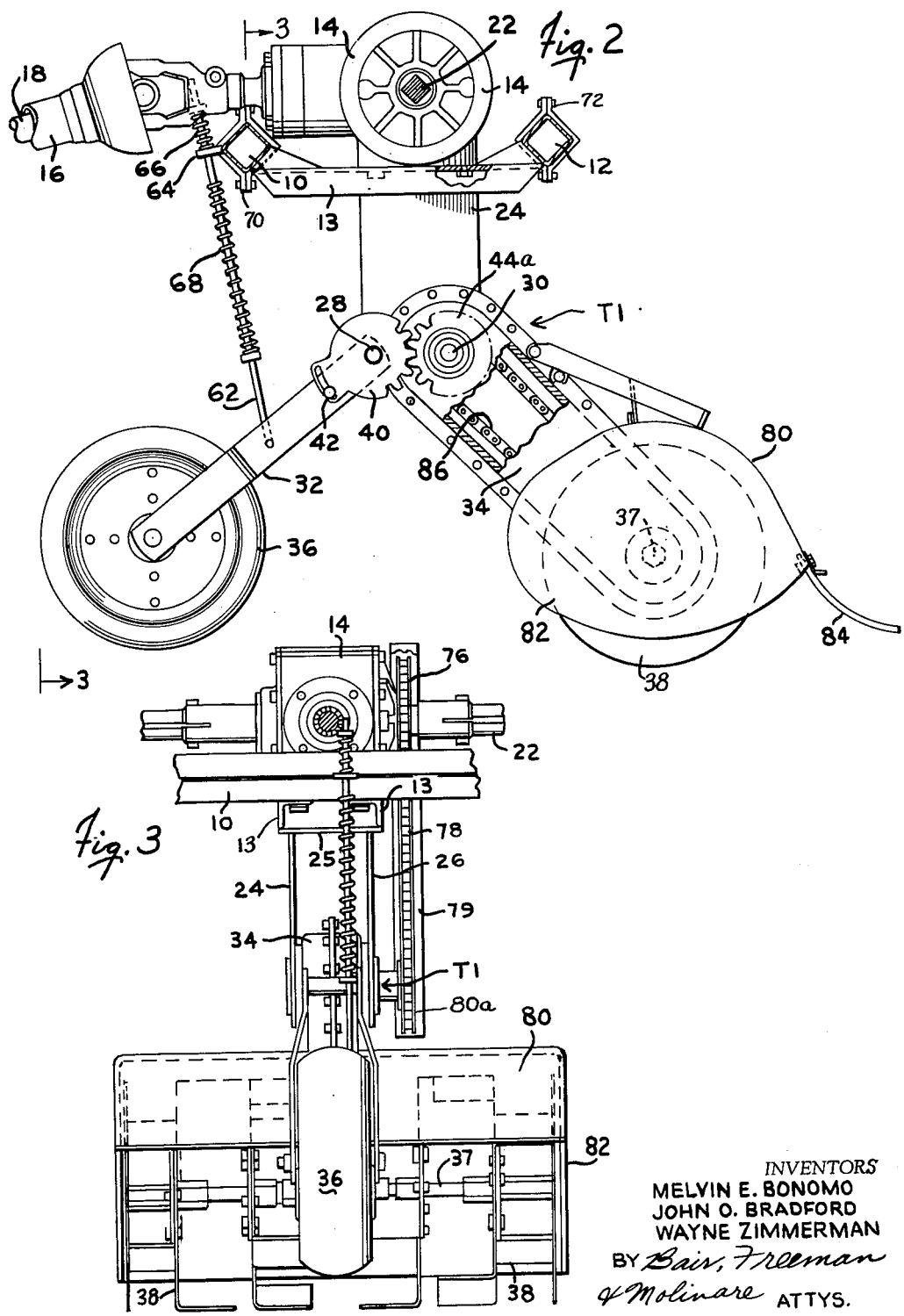
INVENTORS
MELVIN E. BONOMO
JOHN O. BRADFORD
WAYNE ZIMMERMAN
BY Bair, Freeman
& Molinare ATTYS.

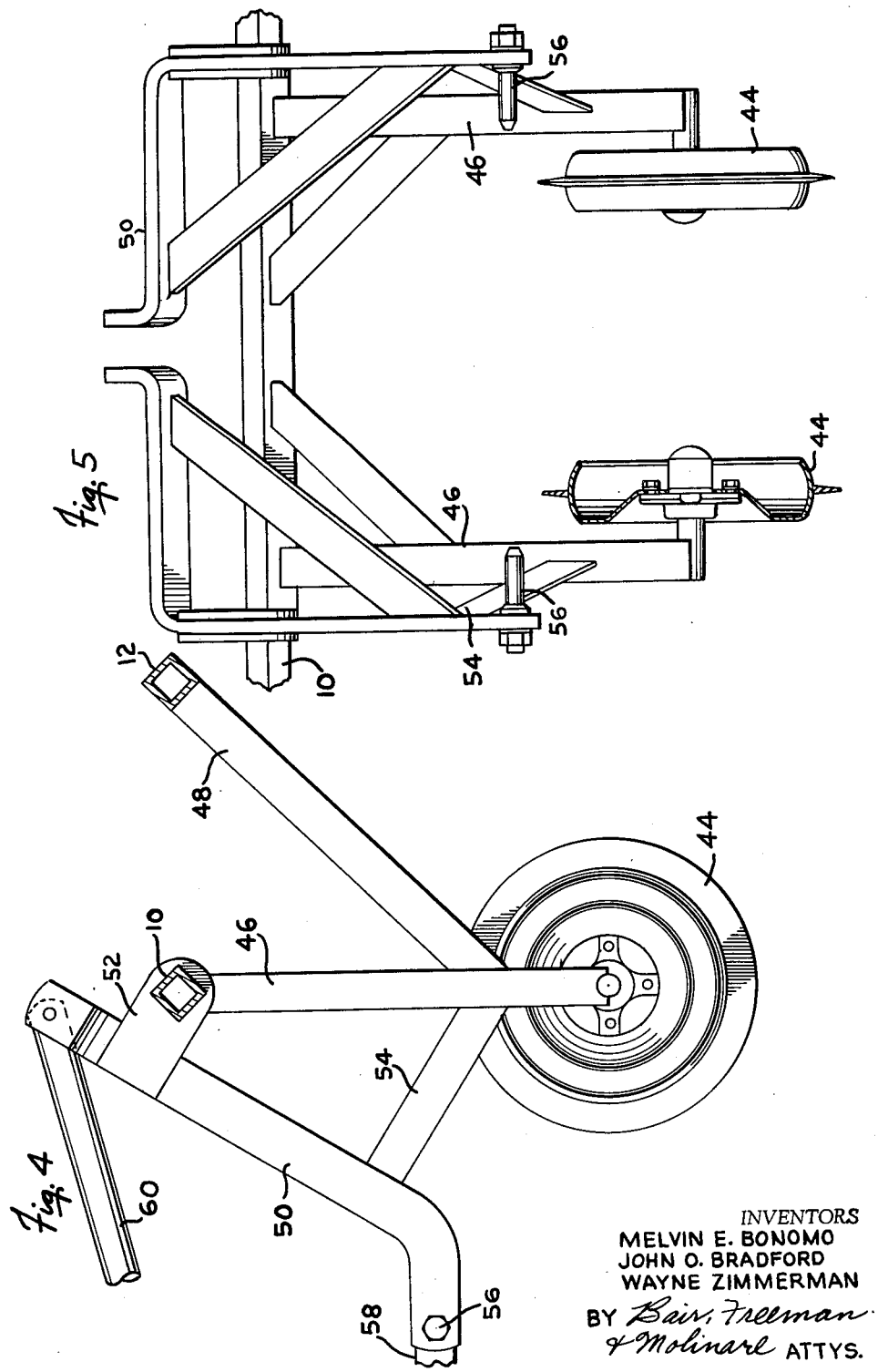

United States Patent Office 3,136,373
Patented June 9, 1964

3,136,373
TRACTOR-DRAWN AND DRIVEN ROTARY
CULTIVATOR
Melvin E. Bonomo, R.R. 9 E., and John O. Bradford,
1013 N. Lott Blvd., both of Gibson City, Ill., and
Wayne E. Zimmerman, 506 N. Roosevelt, Bloomington, Ill.
Filed Sept. 24, 1962, Ser. No. 225,704
4 Claims. (Cl. 172—60)

This invention relates to a rotary cultivator adapted to be drawn by a tractor and having tiller units adapted to be driven from a power take-off of the tractor.

One object of the invention is to provide a rotary cultivator of comparatively simple and inexpensive construction wherein means is provided for automatically compensating for variable contour of the ground surface, a novel arrangement of gauge wheels being provided for this purpose.

Another object is to provide a tiller unit including a gauge wheel and tiller wheel wherein the gauge wheel is mounted on a gauge wheel arm and the tiller wheel is mounted on a tiller wheel arm, adjacent ends of the two arms being geared together for simultaneous upward and downward movement of the gauge and tiller wheels whereby the gauge wheel may respond to the contour of the ground surface over which it travels and thereby effects automatic setting of the tiller wheel for proper tilling depth in relation to such surface.

Still another object is to provide a rotary cultivator in which a transverse frame has a plurality of tiller units mounted thereon and slidably adjustable therealong to accommodate the particular crop being tilled, the adjustment being accomplished in a simple manner and the construction of the drive means for the tillers being such as to be adjustable along with the tiller units by sliding along a take-off driven drive shaft that extends the length of the frame.

A further object is to provide a rotary cultivator having a transverse frame with tiller units mounted thereon, supporting wheels being provided for the frame adjacent the center thereof and the various tiller units being positioned, one at the center and others spaced on opposite sides thereof as desired, and each having its own gauge wheel for automatic adjustment of the tilling depth regardless of the ground surface over which each individual tiller unit travels or the attitude of the tractor.

Still a further object is to provide spring suspensions for the tiller units with respect to the tiller frame and its supporting wheels, which suspensions operate to impose spring pressure on the gauge wheel arm during the tilling operation of the cultivator.

With these and other objects in view, our invention consists in the construction, arrangement and combination of the various parts of our rotary cultivator, whereby the objects above contemplated are attained, as hereinafter more fully set forth, pointed out in our claims and illustrated in detail on the accompanying drawing, wherein:

FIG. 1 is a partially diagrammatic plan view of a rotary cultivator embodying our invention;

FIG. 2 is an enlarged vertical sectional view on the line 2—2 of FIG. 1 showing one of the tiller units of the cultivator and the power take-off driving means therefor;

FIG. 3 is a front elevation of FIG. 2 as taken on the line 3—3 of FIG. 2;

FIG. 4 is an enlarged side elevation of the supporting wheels for the cultivator as taken on the line 4—4 of FIG. 1, and FIG. 5 is a front elevation partly in section of the supporting wheel structure shown in FIG. 4.

On the accompanying drawings we have used the reference numerals 10 and 12 to indicate front and rear frame members which extend transversely with respect to the direction of travel of our rotary cultivator. At their centers these frame members are connected together by cross members 13 welded to the frame members, and a power take-off housing or gear box 14 is bolted thereto as shown in FIG. 2. A power take-off shaft housing 16 extends forwardly to a tractor shown generally at T in FIG. 1 and has the usual power take-off shaft 18 housed therein and suitably connected by means of telescoping and universal joints between the power take-off unit 20 of the tractor T and suitable bevel gears (not shown) in the power take-off housing 14. These bevel gears rotate a drive shaft 22 that extends longitudinally throughout the length of the frame members 10 and 12.

Adjacent the center of the frame 10—12 is a supporting wheel arrangement (shown in FIGS. 4 and 5 particularly) wherein the supporting wheels are illustrated at 44. These are journaled on the lower ends of vertical arms 46 having their upper ends secured to the front frame member 10, and braced by angular braces 48 which have their upper ends secured to the rear frame member 12. Tow bars 50 are secured to the frame member 10 and the vertical arms 46 by means of brackets 52 and 54, and their lower ends terminate in studs 56 for connection to draw bars 58 extending from the tractor T. The upper ends of the tow bars 50 are connected by a link 60 also extending to the tractor. Thus the frame 10—12 is drawn by the tractor and supporting by the supporting wheels 44.

Also adjacent the center of the frame 10—12 is a tiller unit indicated $T^1$ including a plate 25 (see FIG. 3) and a pair of vertical supporting plates 24 and 26 welded to the cross members 13 to form a tiller unit subframe. Pivoted at 28 on the plates 24 and 26 is a gauge wheel arm 32 and pivoted at 30 a tiller wheel arm 34 (see FIG. 2). The gauge wheel arm 32 is of dual character as shown in FIGS. 1 and 3 and a gauge wheel 36 is journaled between the two sides thereof. The tiller wheel arm 34 is in the form of a chain housing and has a tiller wheel shaft 37 journaled in the lower end thereof. Each gauge wheel arm 32 has a gear sector 40 adjustably clamped thereto, the clamp bolt being shown at 42 in FIG. 2, and the tiller wheel arm 34 has a pair of gear sectors 44a secured thereto and meshing with the gear sectors 40. Accordingly it will be obvious that any upward movement of the gauge wheel 36 in FIG. 2 will result in simultaneous and proportional upward movement of the tiller wheel 38 for a purpose which will hereinafter appear.

A spring suspension for the tiller unit $T^1$ is provided and comprises a slide rod 62 which has its lower end pivoted to the gauge arm 32 and its upper end slidable through a bracket 64. A spring 66 is provided on this rod for the purpose of suspending the tiller unit during transport from field to field. The suspended position is shown in FIG. 2 at which time the supporting wheels 44 travel on the ground surface and the gauge wheels 36 and tiller wheels 38 are clear of the ground. When in the field, both the gauge wheels and the tiller wheels would be higher with respect to the frame 10—12 than the position shown in FIG. 2, with the spring 68 somewhat compressed and thus loading the gauge wheel during travel of the tiller unit along the ground surface.

Referring to FIG. 1 it will be noted that the tiller unit $T^1$ at the center of the frame 10—12 is centered with respect to the supporting wheels 44. Additional tiller units $T^2$, $T^3$, $T^4$ and $T^5$ are also shown, $T^4$ being illustrated in complete detail and the other three being shown blocked in diagrammatically inasmuch as they are similiar to the tiller unit $T^4$. These additional tiller units are identical to the unit T¹ except each is mounted for sliding adjustment along the frame 10—12, and for this purpose are provided with clamps 70 and 72 so that they may be adjusted therealong to the desired position depending upon the crop being tilled and then clamped in that position. Each tiller unit T², T³, T⁴ and T⁵ also has a bearing 74 slidable along the drive shaft 22 and a sprocket 76 thereadjacent also slidable along the drive shaft, the bearing 74 being mounted on cross members 13a for the additional tiller units and the cross members in turn being welded to the clamps 70 and 72.

Each tiller unit has a sheet metal hood 80 provided with ends 82 and a flexible drag flap 84 to prevent undue agitation of the soil being tilled.

Each of the five tiller units has its tiller wheels 38 driven by a sprocket 76 on the shaft 22 and a chain 78 around a sprocket 80a on the shaft 30 as shown in FIG. 3, and suitable chain guards 79 are provided for each of the chains 78. Within each tiller wheel arm 34 a chain drive 86 is provided between sprockets (not shown) on the shafts 30 and 37.

*Practical Operation*

In the operation of our rotary tiller, the supporting wheels 44 support the frame 10—12 during the tilling operation and the blades of the tiller wheels 38, due to the rotation imparted thereto by the drive shaft 22 and the chains 78 and 86, rotate to more effectively cultivate the soil than the usual type of non-rotating cultivator shovels.

Regardless of the contour of the ground, or the attitude of the tractor and consequently the attitude of the frame 10—12 drawn thereby, each gauge wheel 36 will follow the contour of the ground just ahead of the corresponding tiller wheels of its tiller unit, rising with high spots and lowering with low spots thereof. Accordingly the tiller arm 34 will be likewise raised and lowered, and the tiller wheels 38 carried thereby accordingly gauged for the proper depth of tillage with respect to the ground surface travelled over. The degree of penetration may be adjusted by means of the angular relationship between the gauge arm 32 and the gear sector 40 made possible by the clamp connection 42. Excessive rise of the gauge wheel is opposed by the spring 68 and thus the gauging operation is automatically performed and limited in a comparatively simple manner.

Depending on the crop being tilled and the spacing between the rows thereof, the tiller units T², T³, T⁴ and T⁵ may be spread apart or condensed closer together whenever desired by merely loosening the clamps 70 and 72 and sliding the units in the proper direction, after which they are reclamped to the frame 10—12. At the same time their driving chains 78 are adjusted longitudinally of the frame 10—12 for proper operation of the tiller units.

Some changes may be made in the constructions and arrangement of the parts of our rotary cultivator without departing from the real spirit and purpose of our invention, and it is our intention to cover by our claims any modified forms of structure or use of mechanical equivalents which may reasonably be included within their scope.

We claim as our invention:

1. In a rotary cultivator a transverse frame adapted to be drawn by a tractor or the like, supporting wheels for said frame independent of the tractor and a plurality of tiller units on said frame each comprising a gauge wheel arm pivoted to said frame and extending forwardly and downwardly from the pivot, a tiller wheel arm pivoted to said frame and extending rearwardly and downwardly from the pivot, a gauge wheel carried by the lower end of said gauge wheel arm, a tiller wheel carried by the lower end of said tiller wheel arm, said gauge wheel being thereby located in advance of said frame and said tiller wheel being substantially spaced therefrom and trailing said frame, the upper ends of said arms being operatively connected together for simultaneous upward and downward movement as said gauge wheel responds to the contour of the ground surface over which it travels, and means for rotating said tiller unit from the power takeoff of the tractor, said tiller units being adjustable along said frame and each one having a depending support, said gauge wheel arm and said tiller wheel arm being pivoted thereto adjacent the lower end thereof, said means for rotating including a drive shaft extending longitudinally of said frame, and each of said tiller units having an operative connection with said drive shaft comprising a first chain drive downwardly from said drive shaft to the pivot for said tiller wheel arm and a second chain drive from said pivot to said tiller wheel.

2. A rotary cultivator comprising a transverse frame adapted to be drawn by a tractor, supporting wheels for said frame located adjacent the center thereof, a gear box, a tiller unit and a tiller wheel drive means also located adjacent the center of said transverse frame, an operative connection from the power take-off of the tractor to said gear box and from said gear box to said tiller unit, a drive shaft extending through said gear box and throughout the length of said frame, additional tiller units each having a sub-frame slidably adjustable along said first frame and each having an operative connection with said drive shaft, each of said tiller units comprising a gauge wheel arm pivoted to said sub-frame and extending forwardly and downwardly from the pivot, a tiller wheel arm pivoted to said sub-frame and extending rearwardly and downwardly from the pivot, a gauge wheel carried by the lower end of said gauge wheel arm ahead of said transverse frame, a tiller wheel carried by the lower end of said tiller wheel arm behind said transverse frame, the upper ends of said arms being geared together for simultaneous upward and downward movement in response to the contour of the ground surface over which the gauge wheel travels, said operative connections each comprising a chain drive downwardly from said drive shaft to the pivot of the tiller wheel arm and a second chain drive from the pivot of the tiller wheel arm and along the arm to the tiller wheel carried by the arm.

3. In a rotary cultivator a transverse frame adapted to be drawn by a tractor or the like, a plurality of tiller units on said frame each comprising a gauge wheel arm pivoted to said frame and extending forwardly and downwardly from the pivot, a tiller wheel arm pivoted to said frame and extending rearwardly and downwardly from the pivot, a gauge wheel carried by the lower end of said gauge wheel arm, a tiller wheel carried by the lower end of said tiller wheel arm, said gauge wheel being thereby located in advance of said frame and said tiller wheel being substantially spaced therefrom and trailing said frame, the upper ends of said arms being operatively connected together for simultaneous upward and downward movement as said gauge wheel responds to the contour of the ground surface over which it travels, and means for rotating said tiller unit from the power take-off of the tractor, said tiller units being adjustable along said frame and each one having a depending support, said gauge wheel arm and said tiller wheel arm being pivoted thereto adjacent the lower end thereof, said means for rotating including a drive shaft extending longitudinally of said frame, and each of said tiller units having an operative connection with said drive shaft comprising a first chain drive downwardly from said drive shaft to the pivot for said tiller wheel arm and a second chain drive from said pivot to said tiller wheel.

4. A rotary cultivator comprising a transverse frame adapted to be drawn by a tractor, a gear box, a tiller unit and a tiller wheel drive means located adjacent the center of said transverse frame, an operative connection from the power take-off of the tractor to said gear box and from said gear box to said tiller unit, a drive shaft extending through said gear box and throughout the length of said frame, additional tiller units each having a subframe slidably adjustable along said first frame and each having an operative connection with said drive shaft, each of said tiller units comprising a gauge wheel arm pivoted to said sub-frame and extending forwardly and downwardly from the pivot, a tiller wheel arm pivoted to said sub-frame and extending rearwardly and downwardly from the pivot, a gauge wheel carried by the lower end of said gauge arm ahead of said transverse frame, a tiller wheel carried by the lower end of said tiller wheel arm behind said transverse frame, the upper ends of said arms being geared together for simultaneous upward and downward movement in response to the contour of the ground surface over which the gauge wheel travels, said operative connections each comprising a chain drive downwardly from said drive shaft to the pivot of the tiller wheel arm and a second chain drive from the pivot of the tiller wheel arm and along the arm to the tiller wheel carried by the arm.

References Cited in the file of this patent

UNITED STATES PATENTS

| | | |
|---|---|---|
| 857,815 | Long | June 25, 1907 |
| 2,317,188 | Hanson | Apr. 20, 1943 |
| 2,616,348 | Ariens | Nov. 4, 1952 |
| 2,644,386 | Sutton | July 7, 1953 |
| 2,689,510 | Petermann | Sept. 21, 1954 |
| 2,691,333 | Shumaker | Oct. 12 1954 |
| 2,757,592 | Morgan | Aug. 7, 1956 |
| 2,935,139 | Dede | May 3, 1960 |
| 2,981,213 | O'Neil | Apr. 25, 1961 |

FOREIGN PATENTS

| | | |
|---|---|---|
| 107,869 | Australia | June 30, 1939 |
| 465,130 | Germany | Sept. 6, 1928 |
| 874,082 | Germany | Apr. 20, 1953 |